(12) United States Patent
Waters (10) Patent No.: US 7,523,186 B1
(45) Date of Patent: Apr. 21, 2009

(54) ACTIVE MANAGEMENT FOR SMALL OFFICE/HOME OFFICE NETWORKING

(75) Inventor: Christopher J. F. Waters, Palo Alto, CA (US)

(73) Assignee: Ubicom, Inc., Sunnyvale, CA (US)

( * ) Notice: Subject to any disclaimer, the term of this patent is extended or adjusted under 35 U.S.C. 154(b) by 771 days.

(21) Appl. No.: 10/763,639

(22) Filed: Jan. 22, 2004

(51) Int. Cl.
*G06F 15/16* (2006.01)
*G06F 15/173* (2006.01)
*G06F 15/177* (2006.01)

(52) U.S. Cl. ............... 709/223; 709/203; 709/217; 719/312

(58) Field of Classification Search ......... 709/217–228, 709/203; 719/310–312
See application file for complete search history.

(56) References Cited

U.S. PATENT DOCUMENTS 7,274,684 B2 * 9/2007 Young et al. ............... 370/352

| | | | |
|---|---|---|---|
| 2003/0093563 A1 * | 5/2003 | Young et al. | 709/245 |
| 2004/0132451 A1 * | 7/2004 | Butehorn et al. | 455/445 |
| 2006/0015935 A1 * | 1/2006 | Dixon et al. | 726/11 |
| 2006/0253903 A1 * | 11/2006 | Krumel | 726/13 |

* cited by examiner

*Primary Examiner*—Haresh N Patel
(74) *Attorney, Agent, or Firm*—Fenwick & West LLP (57) ABSTRACT

According to one embodiment of the present invention, an active management system for a SOHO network includes an active management agent module operating in a SOHO network device that maintains ongoing real-time communications with an active management console module at an active management personal computer in the SOHO network. A secured communications protocol defines the format of packets to communicate queries and responses between the gateway and the active management computer. The queries enable real-time active management functions including outgoing connection approvals, incoming connection approvals, user access authorization, automatic ALG suggestions, personal content filtering, status reporting, and traffic statistics reporting.

16 Claims, 4 Drawing Sheets

ACTIVE MANAGEMENT FOR SMALL OFFICE/HOME OFFICE NETWORKING

BACKGROUND OF THE INVENTION

1. Field of the Invention

The present invention relates generally to small office/home office ("SOHO") network management, and more particularly, to software based tools for active management of networking components.

2. Description of the Related Art

Conventional SOHO networking devices provide a user interface for configuration of device features. The user interface is commonly based on web browsing protocols or, less often, on custom personal computer ("PC") based software, or standard logging mechanisms, such as, electronic mail ("e-mail"), e.g., Simple Mail Transfer Protocol ("SMTP"), or syslog. Although all of these configuration solutions involve a personal computer communicating with a SOHO networking device for configuration, installation, or status reporting purposes, none of these solutions are designed to be used in a real-time and continuous manner. That is, in these conventional systems a user actively interfaces with the networking device by running the user interface software, performing the required configuration functions, and closing the user interface. Thus, no active continuous communication link remains between the SOHO networking device and the user.

It is desirable for the user interface of the SOHO networking devices to be continuous and in real-time because the use of most networking devices is also continuous, or ongoing, and in real-time. For example, SOHO networking devices are used continuously on a day to day basis to access the Internet, and the use is real-time when the user expects an instant response, that is, when a user attempts to load a page from a website across the Internet. Thus, it is desirable to have an open communication link that is continuous and in real-time between the networking device and the user to transmit functional information during the normal operation of the device. Functional information, as opposed to other network data traffic information, is information that relates to the operation or function of the SOHO network device. It remains in the section of the network between the device and the user, i.e., it is not traffic data going through the network device to other sites in the SOHO network or to an outside network.

There are several advantages for a user-network device interface which is ongoing and real-time, for example, a user can be constantly apprised of the status of their network devices, not only when the user decides to actively check the device status. In addition, changing configuration of the networking devices would be easy and quick. Similarly, problems with the devices can cause instant notifications to the user and allow faster problem resolution. An additional benefit would be evident for the installation and initial configuration of the network devices since the device can provide feedback to simplify the installation and initial configuration.

Examples of such network devices include SOHO gateways (also referred to as routers), hardware firewalls, wireless network access points, and the like. These network devices may combine several functions, such as, for example, a SOHO gateway device may include a firewall function, network address translation ("NAT"), dynamic host configuration services ("DHCP"), content filtering, ad blocking, virtual server functions, wireless networking functions, and the like. However, even these multifunctional conventional SOHO gateways lack ongoing, real-time communication links between the network device and the user as described above. For example, unlike their software counterparts, SOHO hardware firewalls, or multifunction SOHO gateways with hardware firewall features, must be configured statically at some time, e.g., during installation, with a set of firewall rules that are subsequently implemented during the hardware firewall operation, without further user input. In contrast, software or personal firewalls running on individual computers provide real time interaction with the user by issuing notifications to the user and asking for user input, for example, to enable certain applications to access the Internet, to block unsolicited attempts to access computer ports, and the like.

Therefore, there is a need for a system and method to provide an ongoing, real-time communication channel between SOHO networking devices and users for transmission of device related functional information.

SUMMARY OF THE INVENTION

The present invention overcomes the problems of conventional SOHO network devices by providing a system and method to enable ongoing, real-time communications between a SOHO network device and a user.

In one embodiment of the present invention, an active management agent module in a network device communicates with an active management console module in a personal computer within the SOHO network in real-time during the normal operation of the network device. The personal computer containing the active management console module displays messages to the user for input in connection with active management features. These features enable the user to regulate the operation of the network device with respect to other personal computers in the SOHO network, that is, they enable the user to act as a SOHO network administrator.

One aspect according to one embodiment of the present invention includes the communications between the active management agent module and the active management console module. A protocol defines the format of packets for message transmissions between the modules. A set of messages enables communications with the network device to control, in real-time, the implementation of the active management features.

In one embodiment of the present invention, data received at the SOHO network device triggers active management functions with different variables configurable based on user input. A query is sent to request user input. The query includes options or variable values that are displayed for a user. The user makes a selection or otherwise responds to the query. The query response is received and based on the user input, the active management function is implemented.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE INVENTION

The Figures ("FIGS.") and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Figure 1:
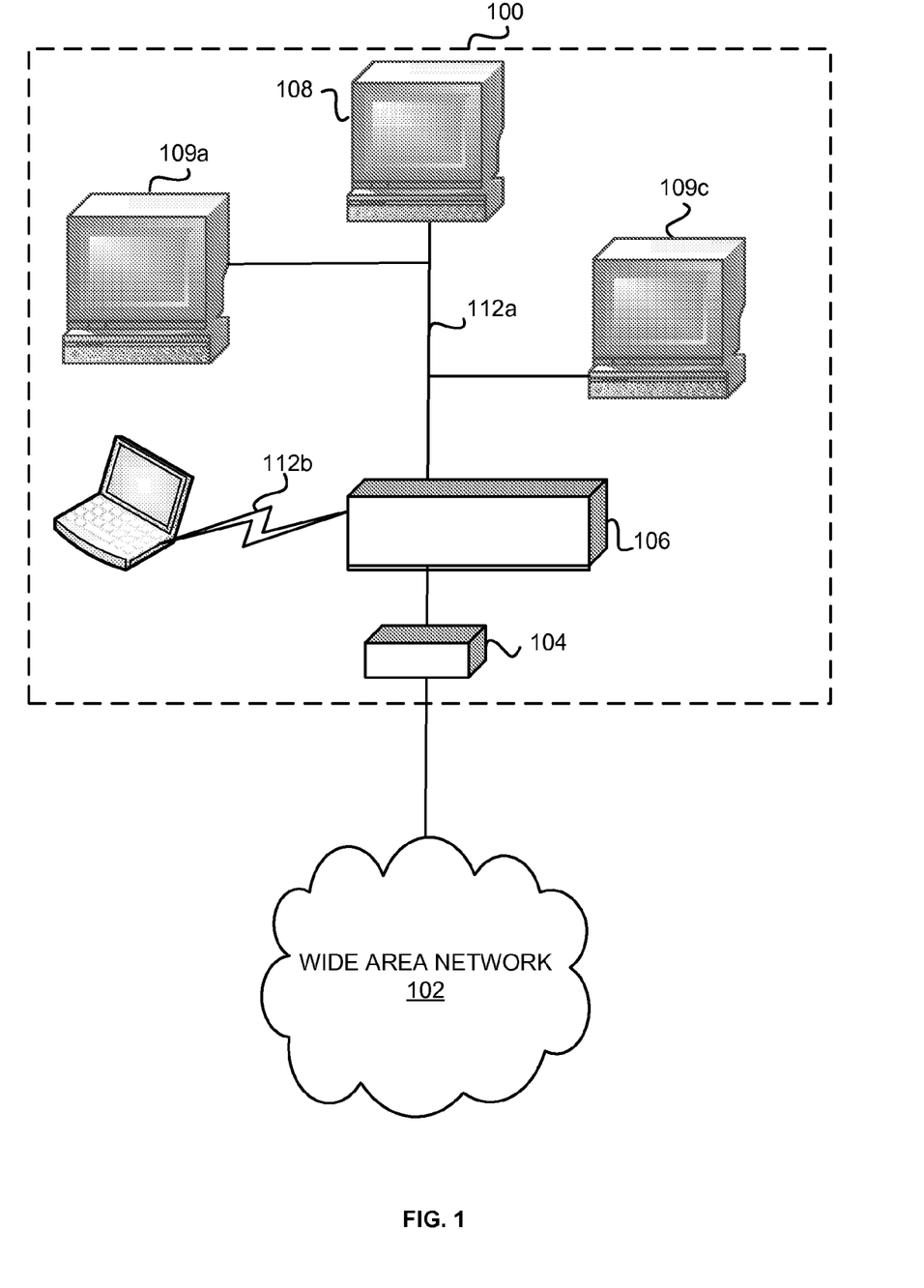
FIG. 1 is a system diagram that illustrates an example of one embodiment of a SOHO network system in accordance with the present invention.

Referring now to FIG. 1, an embodiment of a SOHO network environment in accordance with the present invention is shown. The SOHO network environment 100, or simply a SOHO network 100, connects to a wide area network 102 ("WAN"), for example, the Internet. A connection device 104 links the SOHO network 100 with the WAN 102 using a conventional broadband connection, e.g., digital subscriber line ("DSL"), cable modem technology, digital satellite, T-1, T-3, broadband integrated services digital network ("B-ISDN"), or the like. Other connection methods are possible, such as, dial-up, e.g., 56 Kbps modem, ISDN, or the like, but are not preferred because these slower data-rate technologies are typically not adequate to support data demands of a typical SOHO network 100. In sum, connection device 104 may be any kind of network access device, such as, for example, a cable or DSL modem.

The SOHO network 100 includes a network device 106, an active management personal computer ("PC") 108, and several other personal computers ("PCs") 109a, 109b, and 109c (generally 109). The active management PC 108 can be one or more of the network PCs 109. Other embodiments of the present invention may include additional network devices 106 and active management PCs 108. PCs 108 and 109 are conventional personal or laptop computers, for example, computers based on microprocessors and architectures like those of Intel Corporation, of Santa Clara, Calif. or Apple Computer, Inc. of Cupertino, Calif.

Network devices 106 may include gateways, hardware firewalls, routers, networked cameras, wireless access points, voice over IP ("VoIP") telephones, any combination of these, or other similar devices. In one embodiment of the present invention, SOHO network 100 includes a SOHO network device 106 that is a gateway. In this embodiment, network device 106, or gateway, includes natural address conversion ("NAT") functions, hardware firewall functions, Dynamic Host Configuration Protocol ("DHCP") functions, and wireless access point ("WAP") functions. The SOHO network device 106 connects to the network connection device 104 and links the PCs 108 and 109 among themselves and to the WAN 102. Optionally, SOHO network device 106 may also include WAN 102 access functions making network connection device 104 unnecessary. SOHO local area network connections 112 can be wired (112a) or wireless (112b) network connections. For example, FIG. 1 shows an embodiment of the present invention, wherein network connection 112a is a wired connections (e.g., an Ethernet bus) connecting PCs 108, 109a, and 109c to SOHO network device 106. In addition, network connection 112b is a wireless network connection (e.g., an IEEE 802.11g wireless link) connecting personal laptop computer 109b to SOHO network device 106.

Figure 2A:
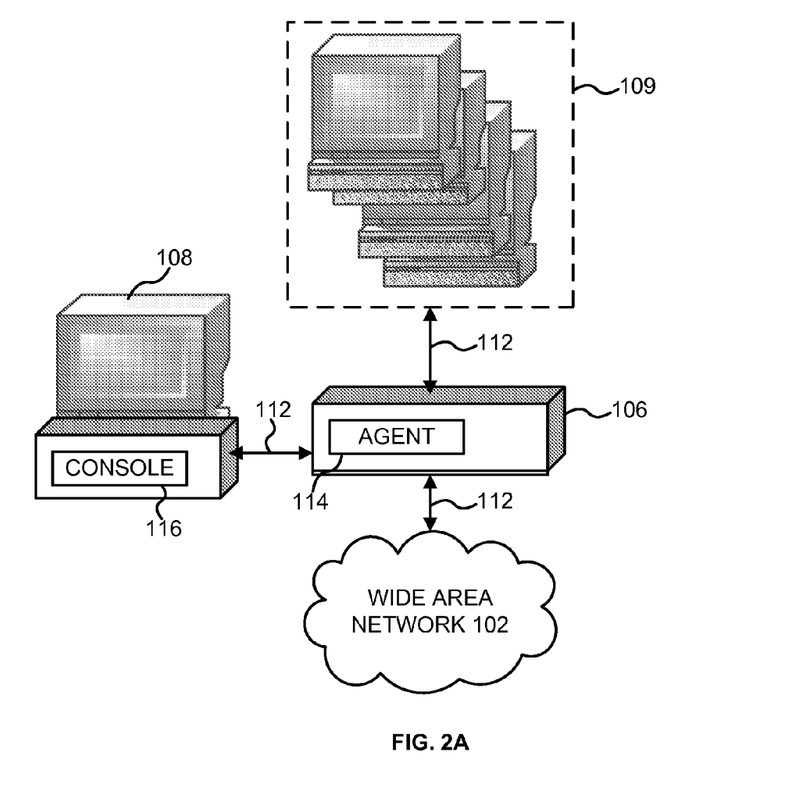
FIG. 2A is a functional diagram that illustrates an embodiment of a SOHO network in accordance with the present invention.

Referring now to FIG. 2A, a functional diagram of a system according to one embodiment of the present invention is shown. According to this embodiment of the present invention, SOHO network device 106, for example, a SOHO gateway, provides access to a WAN 102 for SOHO PCs 109. SOHO network device 106 receives WAN data traffic both inbound to SOHO PCs 109 and outbound to other locations across the WAN 102. One of the several SOHO PCs 109 is the active management PC 108. An active management agent module 114 operates in the SOHO network device 106 and a corresponding active management console module 116 operates in the active management PC 108.

Typically, although not necessarily, one PC in the SOHO network 100 will be the active management PC 108. This computer is typically accessible to only one user. For example, in a household SOHO network, a parent may be the user of the active management PC 108 and other family members, e.g., children, are users of other PCs 109. In an office environment, the active management PC 108 may be solely used by the office's manager, business owner, or the like. In general, the user of the active management PC 108 can be considered a SOHO network administrator. It should be noted that more than one of the SOHO PCs 109 may be an active management PC 108, thus more than one user may be able to act as a SOHO network administrator.

In addition to WAN data traffic, the active management PC 108 communicates in real-time with the SOHO network device 106 to receive and provide functional information (i.e., configuration and operational management information). In contrast, the other SOHO PCs 109 mainly receive WAN data traffic from the SOHO network device 106. In some instances, other SOHO PCs 109 may receive functional information from the SOHO network device 106, for example, a notification of access derived when attempted to access a forbidden domain. The active management computer 108 has real-time control over what data the SOHO network device 106 allows into the SOHO network 100 and what access SOHO network device 106 provides to each SOHO PC 109 in the network.

The control and other real-time active management features enable the user at the active management PC 108 (i.e., a network administrator) to perform or contribute to the SOHO network device 106 performance of several functions. These functions are enabled by communications between the active management agent module 114 in the SOHO network device 106 and the active management console module 116 at the active management PC 108. These modules can be software implementations or dedicated hardware devices (e.g., ASICS, PLAs, other microchips, or similar devices). A system according to this embodiment of the present invention includes the following functions:

Outgoing Connection Approval: The active management agent module 114 monitors all outgoing connections. If these connections have not already been authorized, or are not one of the pre-approved connections (e.g., HTTP, HTTPS, SMTP, POP3) then the active management agent module 114 sends a destination authorization query to the active management console module 116. The user (or network administrator) is then asked for approval of the connection. The user may be presented with some options. For example, a user may be presented with two options: (1) allow this protocol to only be used with this destination SOHO PC 109 or (2) allow this protocol to be used with any SOHO PC 109.

Incoming Connection Approval: The active management agent module 114 also monitors all incoming connections. If a connection does not correspond to an approved outgoing connection, or to an established forwarding rule, then the active management agent module 114 sends an incoming connection authorization query to the active management console module 116. In response, the active management console module 116 prompts the user for approval. Again, the approvals in this case may be SOHO PC 109 specific of general for the SOHO network 100.

Automatic Application Layer Gateway Suggestion: When the active management agent module 114 detects a connection attempt which would require the help of an Application Layer Gateway ("ALG") or a forwarding rule, it requests the active management console module 116 to prompt the user for input regarding whether the ALG or the forwarding rule should be enabled. For example, a destination address/port authorization query can include proposed ALG configurations for the user to authorize.

User Access Approval: each SOHO PC 109 may be associated with a particular user (e.g., by an operating system login process). When a new user in a SOHO PC 109 attempts to access the WAN 102, the active management agent module 114 sends an internal address/user authorization query to the active management console module 116. In response, the active management console module 116 prompts the active management PC 108 user for input on whether to allow the new user to access the WAN 102. Again, the access approval process may be SOHO PC 109 based rather than user based. Each SOHO PC 109 can be recognized by network computer name, IP address, network card MAC address, or the like. Each SOHO PC 109 may have different restrictions on access modifiable in real-time by the active management PC 108 user. For example, this feature provides a means to alert the active management PC 108 user that a foreign or unknown computer has compromised a wireless link of the SOHO network 100 and that it is being used to access the Internet.

Personal Content Filtering: a user at the active management PC 108 can act as a real-time censor of WAN data content or specific servers. The active management agent module 114 can be set up to forward URLs included in HTTP requests from any SOHO PC 109 to the active management console module 116 in content approval queries. The active management console module 116 then can display the query to the user. The user is presented the option to allow the request to proceed to its destination URL or to deny access to the domain or web page designated by the URL. The access decision may be retained in memory at the SOHO network device 106 for future access. For example, if the approval is based on domain name, once a domain name is approved a first time, no further approval would be needed for every page requested from that domain.

Status Display: The active management agent module 114 constantly monitors the connection to the WAN 102 and the connection between the active management agent module 114 and the active management console module 116. The active management agent module 114 feeds this monitoring information to the active management console module 116 in status queries for presentation to the user at the active management PC 108. The status queries can be responsive to user requests or can be scheduled to periodically, or continuously, provide status information for the user. For example, a status display window at the user monitor could include a list of all active connections and their status with any status changes appearing in real-time as they take place.

Statistics Display: The active management console module 116 provides a user interface through which the user at the active management PC 108 can query the active management agent module 114 for statistics of SOHO network device 106 usage. The SOHO network device 106 usage statistics may include, for example, bandwidth utilization, open connections, active users, and the like. In one embodiment of the present invention, the usage data is streamed to the active management PC 108 through the active management console module 116 so that resources in the SOHO network device 106 are freed for other functions. In this embodiment, the computational power of the PC is used to compile and compute any statistics on the usage data for display to the user.

SOHO network device 106 active management features provide solutions to problems previously not addressed by conventional hardware gateway devices. For example, according to one embodiment of the present invention wherein the SOHO network device 106 is a gateway, a user operating a SOHO PC 109 connected to the Internet through the gateway may inadvertently download a Trojan horse program to the SOHO PC 109. The Trojan horse program scours the SOHO PC 109 for confidential or sensitive information and when it attempts to upload the information to a server in the Internet, a firewall feature in the SOHO network device 106 triggers a pop-up window in the display of the active management PC 108 prompting for an option to allow or deny the outbound connection. Unlike conventional hardware firewall devices, which typically default to allow all outbound data transfers, the firewall feature in the gateway provides an option for the user to allow or deny an outbound connection to certain servers in the Internet.

Another example of a novel function enabled in one embodiment of the present invention is the real-time port-forwarding configuration for hardware firewall gateways. For example, referring back to the previous embodiment, a user of the active management PC 108 may want to play a computer game with a friend whose computer is accessible via the Internet through the gateway. Conventional hardware firewall gateways would require the user to configure the firewall ahead of time to allow traffic from the friend's computer Internet protocol ("IP") address through to the user's PC. However, SOHO network device 106 pops up a window in real time at the display of the active management PC 108 notifying the user that another computer with a certain domain name or IP address is trying to make a gaming connection. With the simple click of a button, the user can configure the port in SOHO network device 106 to allow the gaming connection.

Yet another feature enabled in a system according to this embodiment of the present invention is a parental control (or censorship) feature. For example, a parent (or manager of a small office) can set up a filter rule on a SOHO network device 106 such that when a domain in the Internet meeting the filter rule is being accessed, a permission window pops up in the active management PC 108 for the parent (or manager) to allow or disallow the access. Optionally, once access is allowed a first time, the SOHO network device 106 may learn the domain name (or the universal resource locator ("URL") of a particular web page) and allow subsequent access without prompting the parent for permission.

Figure 2B:
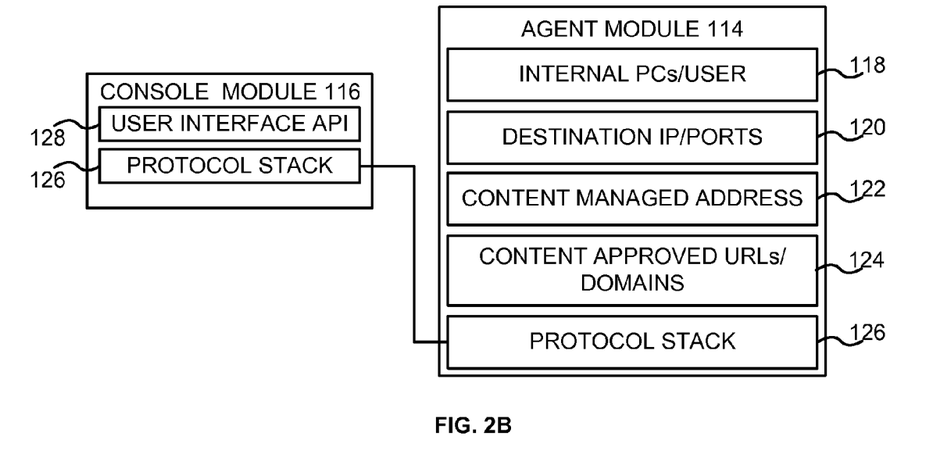
FIG. 2B is a functional block diagram of sample data lists and submodules of system modules according to one embodiment of the present invention.

Now referring to FIG. 2B, a functional block diagram of the different data sections of system modules according to one embodiment of the present invention is shown. The active management agent module 114 interacts with other components of SOHO network device 106 to implement active management features. In one embodiment of the present invention, agent module 114 may include memory devices to implement these features. The active management agent module 114 keeps track of certain data or states to enable these active management functions. The active management agent module 114 includes an Internal PC/User list 118 of authorized SOHO PCs 109 or users that have been previously approved for access to the WAN 102. This list may include IP addresses, network computer names, user IDs, or the like. In addition, a Destination IP Address/Port list 120 maintains identifiers for IP addresses and ports to which outgoing connections have been previously approved. This list may be part of a firewall module accessible by the active management agent module 114 or may be an independent list maintained by the active management agent module 114.

The active management agent module 114 also maintains a Content Managed Addresses list 122. This list includes identifying information (e.g., internal IP address) of SOHO PCs 109 for which content filtering rules apply. Similarly, the active management agent module 114 maintains a content approved URL/Domain list 124 indicating which URLs or Domains have been approved for being accessed by one or more SOHO PCs 109 or users. This list includes a correlation between approved URLs or Domains and corresponding authorized SOHO PC 109 or user id (provided in the Content Managed Address list 122). If no SOHO PC 109 or user is identified, all of them will be granted access to the approved URLs or Domains. These lists support the active management personal content filtering feature of the present invention.

In addition, the active management agent module 114 maintains a protocol stack 126 particularly defining the communications between the active management agent module 114 and the active management console module 116 (the communication protocol is further discussed herein in subsequent sections). Likewise, the active management console module 116 includes a protocol stack 126 for bi-directional communication. The active management console module 116 optionally includes a user interface application programming interface ("API") 128. The user interface API provides an interface for the active management console module 116 to communicate to the user through different user interfaces. In one embodiment of the present invention, a hypertext markup language ("HTML") interface is provided for a web browser based user interface. The same user interface can be shared between the active management system and the SOHO network device 106 conventional configuration utility.

Figure 3:
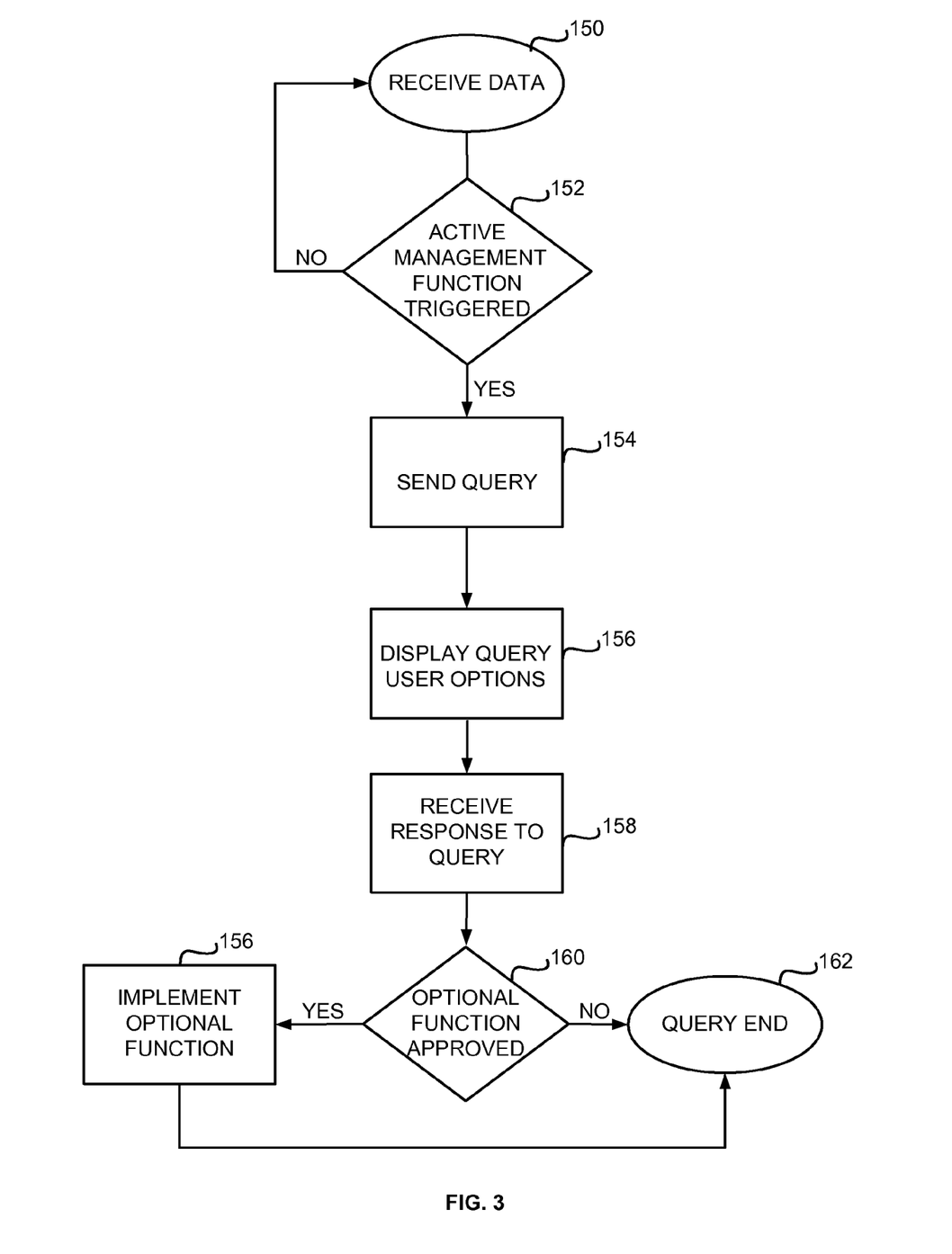
FIG. 3 is a flow chart for an active management method for a SOHO network according to one embodiment of the present invention.

Now referring to FIG. 3, a method according to one embodiment of the present invention is shown. WAN traffic data is received 150 at a SOHO network device 106. Based on the SOHO network device 106 configuration, the data may trigger 152 one of the SOHO network device 106 active management features. While no active management function is triggered 150, WAN traffic data gets transferred through the SOHO network device 106. However, once data received triggers 152 an optional function, the active management agent module 114 communicates with the active management console module 116 to send 154 a query with respect to the function triggered. Depending on the function triggered, the query may be a simple binary approval, e.g., connection request, or may include a set of values for variables that are input to the triggered active management function, e.g., suggested ALG or firewall rules. For example, data embodying an HTTP request may trigger 152 the optional censor function which may include variables relating to whether to block or accept the connection, whether to apply the response to the user, the SOHO PC 109, and whether to consider the Domain or the URL for implementing the censor function.

The active management console module 116 then interacts with a user interface on the management PC 108 to display 156 the query to the user (e.g., the network administrator). For example, the display may be in the form of a pop-up window at the user's computer monitor. The user interface may be programmable or customized differently for different systems. According to one embodiment of the present invention, a web-browser-based interface is provided that includes the conventional configuration interface and the active management console module 116 interface. The user of the active management PC 108 may, when prompted, provide a response to a query. In some situations, e.g., if the user is not at the active management PC 108, then the user provides no response and the active management console module 116, for example after a certain time-out period, may provide a default response, typically a response to preserve status or to avoid change. The query response, either from the user or the default, is received 158 by the active management agent module 114.

Further, in some situations, the active management console module 116 may not be present to respond to a query, for example, if the active management PC 108 is off or does not have the active management console module 116 software loaded in RAM memory. In this case, the response is protocol dependent. If a connection-based protocol is used for the transport, the active management agent module 114 will know immediately that the active management console module 116 is not present and assume a response to the query that maintains the same status. However, if a non connection-based protocol is used, e.g., a UDP based protocol, the active management agent module 114 will wait for a timeout period without response before realizing that the active management console module 116 is not available. After the timeout period, the active management agent module 114 would assume a "no-change" default response to the query.

During the time period between the sending 154 of the query and the receiving 158 of a response, the active management agent module 114 has to deal with the flow of inbound or outbound suspect data packets arriving at the SOHO network device 106 that are the subject of the query. In one embodiment of the present invention, the active management agent module 114 queues all these suspect packets while the query is outstanding. The active management agent module 114 maintains separate queues for each outstanding query and aggregates packets corresponding to the same query. The active management agent module 114 may include memory resources to accomplish this task or may otherwise coordinate with the SOHO network device 106 for the queuing of suspect packets.

According to another embodiment of the present invention, neither the active management agent module 114 nor the SOHO network device 106 has sufficient resources to queue suspect packets while waiting for query responses. In this embodiment, suspect packets are silently dropped. Silently dropping the packets will cause the retry mechanism for the suspect protocol to re-send the packets. Some applications may timeout before the query is complete. For example, displaying a pop-up window to request a connection authorization from a user may take longer than a typical timeout period for a connection, thus, the connection may timeout. This will make it appear as if the connection was refused. If later the query response is positive then a subsequent connection request will be successful. For example, after a back-off or retry period has elapsed, a connection may be retried and with the connection logged as authorized based on the user response, upon retry the connection will proceed.

The active management agent module 114 provides query response information to the SOHO network device 106 for the SOHO network device 106 to implement 156 the active management function. If the query response simply provides information to not implement the active management function, the SOHO network device does not implement the active management function. In either case, the active management query ends 162 until a subsequent active management function is triggered by WAN data traffic. It should be noted that approving 160 an optional function might indicate that access is denied, for example, if the censor function is approved for a particular domain, access to that domain is denied.

The active management features of SOHO network devices 106 according to one embodiment of the present invention are enabled by the communications between an active management agent module 114 and an active management console module 116. A communication link between these two modules is established when one of the active management PCs 108 enables the operation of the active management console module 116. For example, an active management PC 108 can be configured to run a software implementation of an active management console module 116 upon system start-up by including a program call in the system initialization batch file.

The communication between the active management agent module 114 and the active management console module 116 is based on a communications protocol that defines a set of messages. No protocol currently exists which includes all of the capabilities necessary to implement the features described above. One embodiment of the present invention includes a proprietary protocol to define the communication messages between the active management agent module 114 and the active management console module 116. However, there are a number of existing protocols that could be extended and customized to be able to support the SOHO network device 106 active management features. The following are some examples of existing protocols that can serve as a basis for a customized protocol:

Simple Network Management Protocol ("SNMP"): SNMP is a general-purpose protocol. No current Management Information Base ("MIB") supports all of the features, but a combination of enterprise and standard MIBs could be created to implement them.

Transmission Control Protocol/User Datagram Protocol ("TCP/UDP"): A completely proprietary protocol could be used-optionally based on Ubicom Device Addressing Protocol/Ubicom Configuration Protocol ("UDAP/UCP"), available from Ubicom, Inc. of Mountain View, Calif. Regardless of the transport protocol, UDAPJUCP may still be used to implement initial device discovery.

Universal Plug and Play ("UPnP"): UPNP provides general-purpose property "GET" and "SET" capabilities as well as asynchronous event notification. UPnP is being adopted in many gateway implementations. The currently standardized UPNP Device Control Protocols ("DCP") do not fully support the type of active management functionality of the present invention, but can be used to implement the installation of port forwarding rules.

According to one embodiment of the present invention, a UPnP based proprietary protocol defines the messaging communications between the active management agent module 11-4 and the active management console module 116. The protocol is general-purpose, i.e., it supports all primitive operations already in use in SOHO gateways and it is supported by Microsoft® Windows® operating systems ("Windows"), of Microsoft Corporation, Redmond, Wash. However, a drawback of UPnP based protocols is the varying support in different versions of Windows. For example, Windows contains a NAT traversal API for configuring a UPNP gateway. This API is supported on Windows 98, ME and XP, but not on Windows 2000. Therefore, according to this embodiment of the present invention, variations of the protocol stack are needed for different versions of Windows operating systems.

In another embodiment of the present invention, a proprietary protocol is a UDP based protocol. The UDP based protocol comprises at least six basic packet types to support agent-console queries. Table 1 shows a sample set of packet types.

| Packet Type ID | Description |
| --- | --- |
| 0x01 | Outgoing connection approval request |
| 0x81 | Outgoing connection approval response |
| 0x02 | Incoming connection approval request |
| 0x03 | Connection allocation request (creates new connection record in NAT table for port triggering). |
| 0x83 | Connection allocation response |
| 0x84 | Firewall entry allocation request |
| 0x85 | Firewall entry allocation response |

Figure 4:
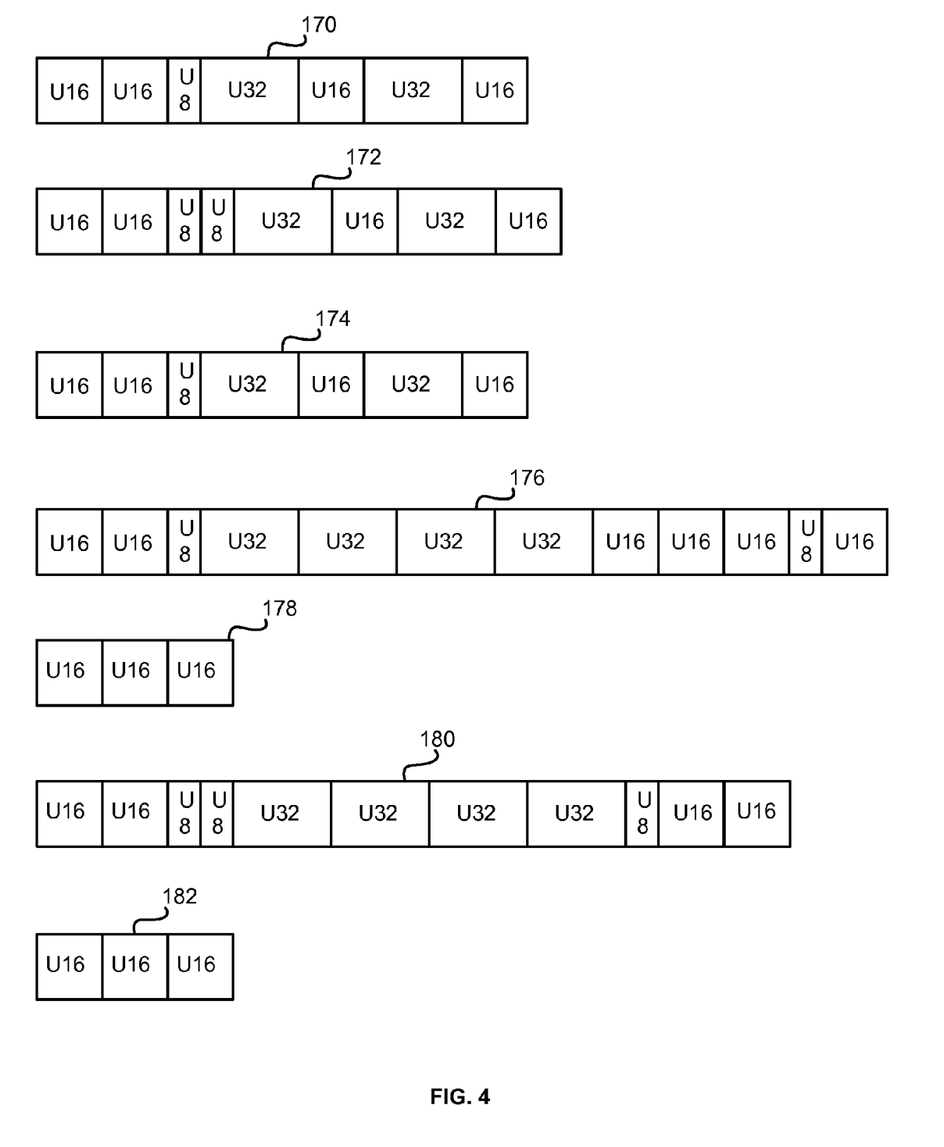
FIG. 4 is a diagram of sample packet formats for a set of packets according to a communications protocol of one embodiment of the present invention.

Now referring to FIG. 4, a diagram of sample packet formats for a set of packets according to one embodiment of the present invention is shown. Each packet is made up of a set of data unit sections. The data unit sections may be 8-bit sections ("U8"), 16-bit sections ("U16"), or 32-bit sections ("U32"). All the packets begin with two U16s labeled packet_type and session_id. The packet_type U16 specifies the type of packet by including a packet type ID as shown in Table 1. The second U16, session_id, is used to identify the session so that request packets can be unevenly matched with response packets.

An outgoing connection approval request packet 170 also includes a U8 ("protocol") to specify the protocol type subject of the request (i.e., TCP/IP, FTP, or the like). Following is a U32 ("source_addr") to specify the IP address of the SOHO PC 109 requesting access to the WAN 104. The source_addr is followed by a U16 ("source_port") to indicate which port in the source SOHO PC 109 the request is originated from. Similarly, the packet follows with a U32 ("dest_addr") followed by a U16 ("dest_port") to indicate IP address and port of the destination computer on the WAN 104.

An outgoing connection approval response packet 172 carries information back to the active management agent module 114 to indicate the user's response. This packet follows the session_id U16 with a U8 ("approval_status") to indicate whether the request is approved, i.e., 1 or rejected, i.e., O. This is followed by redundant connection information included in the request, that is, source-addr U32, source_port U16, dest_addr U32, and dest_port U16. The response packet 172 may include the redundant connection information to overcome the need for the active management agent module 114 to maintain the connection state information while waiting for the response. In addition, the active management console module 116 may modify any of the connection values. For example, the user may approve the connection for all SOHO PCs 109 rather than just the source. Thus, the active management console module 116 may modify the source_addr U32 with some wild-card value (e.g., 0) to indicate that the connection should be allowed to all SOHO PCs 109. While the active management agent module 114 awaits the response packet 172, outbound data packets are silently dropped and multiple requests are issued. However, the active management console module 116 recognizes when requests are duplicative and only sends one response packet 172. The active management console module 116 may also detect that the protocol subject of the request, i.e., specified in the protocol U8, is of a kind that requires special support, e.g., port triggering. Thus, the active management console module 116 may send an unsolicited NAT connection allocation packet to the gateway NAT module.

In one embodiment of the present invention, outgoing connection approval response packet 172 is unnecessary. Instead, the active management console module 116 creates firewall entries directly into the firewall module to allow the connection, requiring no further action on the part of the active management agent module 114. This type of scheme would make authentication essential since the firewall and NAT would be completely controllable from inside the SOHO network 100.

Referring back to FIG. 4, an incoming connection request packet 174 is formatted like the outgoing connection approval request packet 170. However, the incoming request 174 indicates a 0×02 value in the packet_type U16. Like the outgoing connection approval the console module 116 may send packets to the agent module 114 to reconfigure the firewall directly instead of sending an incoming connection response.

A connection allocation request packet 176 is sent by the active management console module 116 to the active management agent module 114 and creates new connection records in the NAT table. This allows the active management console module 116 to implement port triggering and to allow the console module 116 the ability to create entries directly in the connection table of the agent module 114. The connection allocation request packet 176 follows the session_id U16 with three U32s and three U16s. The U32s indicate the internal SOHO network address, the external WAN address, and the NAT address, and are labeled internal_addr, external_addr, and nat_addr. The U16s indicate the corresponding ports at these addresses and are labeled internal_port, external_port, and nat_port. The packet format continues with a U8, obtain_nat_port, to request a NAT port of the firewall module, and finished with a U16, timeout, to indicate how many seconds the wait period will last, a zero (0) can be used to indicate no timeout. The connection allocation response packet 178 simply includes, in addition to the first two U16s, a U16 ("status") for the active management agent module 114 to indicate whether the connection record in the NAT table was created, e.g., zero (0) to indicate success, 1 to indicate failure due to table full condition, and 2 to indicate other failure.

The format of a firewall entry allocation request packet 180 is shown in FIG. 4. This packet is sent from the active management console module 116 to the active management agent module 114 to request that the firewall unit allocate an entry for a connection. The format of the firewall entry allocation request packet 182 follows the common initial U16s with a U8 ("traffic_type") to indicate whether the traffic is ingress or egress, e.g., 1 or 0. This is followed by another U8 ("rule type") to indicate whether the firewall entry is to allow or deny access, e.g., zero (0)=allow and 1=deny. The next set of bits, four U32s, are used to specify the source and destination IP address range, and are labeled source_addr_start, source_addr_end, dest_addr_start, and dest_addr_end. These are followed by a U8 ("protocol") to specify the protocol type for the request, and two U16s to indicate the ranges of ports that relate to the request, which are labeled dest_port_start and dest_port_end. The format of the firewall entry allocation request packet 182 is identical to the format of the connection allocation response packet 178. In use, the packets can be the packet_type ID indicated, i.e., as shown in Table 1.

Another aspect of a protocol according to one embodiment of the present invention, is the protocol's security features. Since the protocol is being used to manage the security of a SOHO network device 106, it is essential that the protocol itself is secure. For example, an internal user wanting to access the WAN 102 could spoof a response to an outgoing connection request to obtain unlimited external WAN 102 access. Therefore, the protocol should provide some level of security. Although authentication is sufficient, encryption may also be used for added security. However, it should be noted that encryption is not required because the same information an attacker can derive from agent-console communications is equally available from WAN data traffic. That is, observing the communication between the active management agent module 114 and the active management console module 116 an attacker could glean significant information about the traffic being sent to the WAN 102 but simply sniffing all network traffic in and out of the SOHO network 100 would provide the same information.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. An active management system for controlling real-time operation of a Small Office/Home Office (SOHO) network having a SOHO network device and an active management personal computer, the active management system for controlling real-time operation of the SOHO network device comprising:

an active management console device configured to operate in the active management personal computer, the active management console module for enabling real-time communication of active management queries to configure the SOHO network device from the active management personal computer to the SOHO network device during operation of the SOHO network device on an active communication link; and an active management agent device, remote from the active management console device, configured to operate in the SOHO network device for communicating real-time active management queries to configure the SOHO network device in real-time between the active management console device and the SOHO network device on the active communication link;

wherein the active communication link comprises a communication link transmitting functional information relating to the operation of the gateway device and data traffic.

2. The system of claim 1, further comprising, a firewall module: configured to operate in the SOHO network device and communicatively coupled to the console agent for implementing firewall rules in response to query responses from a user.

3. The system of claim 1, wherein the active management agent device further comprises a memory device for storing a set of lists.

4. The system of claim 3, wherein the set of lists comprises at least one of an approved internal IP address list an approved destination IP addresses and ports list, a content managed computer identifier list, and a content approved URL and Domain Name list.

5. The system of claim 1, further comprising a second active management console device operating in a second active management personal computer in the SOHO network.

6. The system of claim 1, wherein the active management console device is implemented in software executable by a processor in a personal computer.

7. The system of claim 1, wherein the active management agent device is implemented in software executable by a processor in the SOHO network device.

8. The system of claim 1, wherein the active management agent device and the active management console device include a protocol stack, the protocol stack for enabling communications between the active management agent device and the active management console device to implement a set of active management gateway functions.

9. A method for enabling real-time user input for implementing active management gateway functions in a Small Office/Home Office (SOHO) network having an active management computer and a gateway device, the method comprising:
receiving one or more data packets that trigger a code to implement an active management gateway function;
in response to receiving the one or more data packets, sending an active management query from the gateway device to an active management console module at the active management computer using an active communication channel, the active management computer remote from the gateway device;
receiving, at the gateway device, an active management query response from the active management console module at the active management computer via the active communication channel, the active management query response for configuring the gateway device; and
in response to receiving the active management query response at the gateway device, implementing the active management gateway function at the gateway device in real-time according to the information provided in the active management query response;
wherein the active communication link comprises a communication link transmitting functional information relating to the operation of the gateway device and data traffic.

10. The method of claim 9, further comprising displaying options based on the active management query to a user at the active management personal computer.

11. The method of claim 9, wherein the active management gateway function is a user input based firewall rule.

12. The method of claim 9, wherein the active management gateway function is a real-time, personal, content-filtering function to prompt a user at the active management computer for access authorization based on one of a domain name or a URL.

13. The method of claim 12, further comprising, in response to receiving an active management query response from the active management console module indicating an access grant to a domain name, storing an identifier corresponding to the domain name with an access rule to be automatically implemented for subsequent accessing of said domain.

14. The method of claim 9, wherein the active management gateway function is a real-time, user access authorization function to prompt a user at the active management personal computer for access authorization to a WAN for a second personal computer in the SOHO network.

15. The method of claim 14, wherein the access authorization is based on one of a user name or a network computer identification.

16. The method of claim 9, wherein implementing active management gateway function includes a creating an ALG at the SOHO network device in response to a user approval of a suggested ALG authorization request included in the active management query.

* * * * *